(12) United States Patent
Zock

(10) Patent No.: US 11,795,844 B1
(45) Date of Patent: Oct. 24, 2023

(54) OIL COOLER ASSEMBLY AND METHOD OF IMPROVING COOLING SYSTEMS OF ALL-TERRAIN VEHICLE

(71) Applicant: Richard Mellick Zock, Lapeer, MI (US)

(72) Inventor: Richard Mellick Zock, Lapeer, MI (US)

(*) Notice: Subject to any disclaimer, the term of this patent is extended or adjusted under 35 U.S.C. 154(b) by 0 days.

(21) Appl. No.: 17/814,878

(22) Filed: Jul. 26, 2022

(51) Int. Cl.
*F01M 5/00* (2006.01)
*F01M 11/02* (2006.01)
*B62K 5/01* (2013.01)
*F01M 11/00* (2006.01)

(52) U.S. Cl.
CPC ............ *F01M 5/002* (2013.01); *B62K 5/01* (2013.01); *F01M 11/02* (2013.01); *F01M 2005/004* (2013.01); *F01M 2011/0095* (2013.01)

(58) Field of Classification Search
CPC .. F01M 5/002; F01M 11/02; F01M 2005/004; F01M 2011/0095; B62K 5/01; B62K 25/28; B60K 11/08
See application file for complete search history.

(56) References Cited

U.S. PATENT DOCUMENTS

| | | | |
|---|---|---|---|
| 8,887,688 B1* | 11/2014 | Neal | F01M 1/10 123/196 R |
| 2009/0139473 A1* | 6/2009 | McMillan | B62J 41/00 165/41 |

* cited by examiner

*Primary Examiner* — Syed O Hasan
(74) *Attorney, Agent, or Firm* — Dunlap Bennett & Ludwig, PLLC

(57) ABSTRACT

An oil cooling assembly for an All-Terrain Vehicle (ATV) and a method of improving the efficiency of the ATV's cooling system is provided. The assembly or kit may include a relocating bracket that can be used to affix the original equipment manufacturer (OEM) oil cooler to a front portion of the ATV after the OEM oil cooler is removed from underneath the ATV frame. The kit may include a new reservoir tank that is larger than the OEM oil tank, as the relocation of the OEM oil cooler affords more spaced to accommodate the larger reservoir tank. The kit includes fluid conduits and barbed fittings to fluidly connect the relocated oil cooler to the reservoir tank, the reservoir tank to the motor, and the motor to the relocated oil cooler.

9 Claims, 3 Drawing Sheets

OIL COOLER ASSEMBLY AND METHOD OF IMPROVING COOLING SYSTEMS OF ALL-TERRAIN VEHICLE

BACKGROUND OF THE INVENTION

The present invention relates to oil coolers systems for All-Terrain Vehicles (ATV) and, more particularly, an improved oil cooler system having a larger capacity oil tank that is relocated by way of a relocating bracket for increasing the ATV's cooling efficiency, relative to the original equipment manufacturer oil cooling system, especially for 1999-2014+ Honda TRX400EX ATV and 2014-2019+ HONDA TRX400X ATV.

Oil cooling is the use of engine oil as a coolant, typically to remove surplus heat from the operatively associated internal combustion engine. The hot engine transfers heat to the oil which then usually passes through a heat-exchanger, which cools the oil prior to the cooled oil flowing back into the hot engine to cool the engine continuously.

Lack of oil cooling capability for stock or modified engines, which are commonly found on All-Terrain Vehicles (ATVs), can limit the use and enjoyment the ATV. Many of the most popular ATVs are no longer being produced by the original manufacturer, and so many of their parts related to oil coolers are not available for replacement as well.

Many oil coolers for such ATVs are fit into the location defined by the original manufacturer—under a central portion of the frame of the vehicle. Essentially due south of the handlebars. Unfortunately, these original manufacturer locations have no or minimum air flow to assist in the cooling of the oil because they are surrounded by body portions and other equipment. This ensconced location near the under the upper portion of a central portion of the frame limits oil cooling potential as this location, being surrounded by frame body and equipment parts can trap heat due to limited direct access to the external environment as well as due to a closer proximity to the heat-generating engine. This location is also upward of the heat-generating engine, within a veritable pocket of body parts and equipment, and since heat rises, this only compounds the inefficiencies of the prior art. As a result, this original manufacturer location of the oil cooler can diminish or even end performance during heavy duty riding conditions for many popular ATVs.

As can be seen, there is a need for an improved oil cooler system having a larger capacity oil tank that is relocated on the machine, by way of a relocating bracket, for increasing the cooling efficiency of the ATV's oil relative to the original equipment manufacturer (OEM) oil cooling system. The improved oil cooler kit embodied in the present invention provides a larger oil reservoir, and, critically, the improved oil kit of the present invention is placed and secured to the front of the ATV—in direct contact with the external environment—to significantly increase air flow across and over the oil cooler, thereby increasing the cooling effect relative to the OEM location.

The relocation of the oil cooler position from under the frame, where no or minimum air flow is present, to a frontal, exposed position increases airflow over the surface of the oil cooler. This position affords more space and thus allows for a larger capacity oil tank as well. This larger tank provides the machine with a greater volume of oil for lubrication and cooling properties. Again, the placement enables more efficient cooling of the oil through bringing more of the oil in more contact with the airflow resulting from driving the ATV. Since the relocation places the heat exchanger in front of the vehicle, exposed to the onrush of air from driving the vehicle, the present invention has advantages over the prior art.

The securement and placement of the larger, frontal, exposed disposition of the oil cooler is accomplished by way of a systemic relocating bracket dimensioned and adapted to operatively associate with both the systemic oil cooler and the frame of the ATV. In effect, the heat exchanger of the oil cooler is increased as more of the thermal energy of the oil is transferred to the auxiliary working fluid that is the airflow around the ATV.

SUMMARY OF THE INVENTION

In one aspect of the present invention, a method of improving a cooling system of an original manufacturer (OM) All-Terrain Vehicle (ATV), the method includes relocating a heat exchanger of the cooling system so that the heat exchanger is outside of a frame of the ATV and forward of body paneling of the ATV.

In another aspect of the present invention, the method of improving a cooling system of an original manufacturer (OM) All-Terrain Vehicle (ATV), wherein the relocated heat exchanger is farther away from an engine of the ATV and farther downward relative to an OM location of the heat exchanger, further including attaching the relocated heat exchanger by way of a U-shaped bracket that exposes the relocated heat exchanger to an external environment, further including replacing an OM reservoir tank with a systemic reservoir tank that is substantially larger by volume, and further including fluidly coupling the systemic reservoir tank and the relocated heat exchanger to the engine of the ATV as well as each other by way of fluid lines, wherein two of the fluid lines are coupled to the engine by way of threaded barbed fittings.

In yet another aspect of the present invention, a kit for improving a cooling system of an original manufacturer (OM) All-Terrain Vehicle (ATV) includes the following: a U-shaped bracket dimensioned to connect to a front frame member of the OM ATV so that the two legs of the U-shaped bracket extend forward of the front frame member; a systemic reservoir tank, wherein the systemic reservoir tank is substantially larger by volume than an OM reservoir tank of the ATV; a plurality of fluid lines; and at least two threaded barbed fittings connected to two of the plurality of fluid lines to an engine of the ATV.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides an oil cooling assembly for an All-Terrain Vehicle (ATV) and a method of improving the efficiency of the ATV's cooling system. The assembly or kit may include a relocating bracket that can be used to affix the original equipment manufacturer (OEM) oil cooler to a front portion of the ATV after the OEM oil cooler is removed from underneath the ATV frame. The kit may include a new reservoir tank that is larger than the OEM oil tank, as the relocation of the OEM oil cooler affords more spaced to accommodate the larger reservoir tank. The kit includes fluid conduits and barbed fittings to fluidly connect the relocated oil cooler to the reservoir tank, the reservoir tank to the motor, and the motor to the relocated oil cooler.

Figure 1:
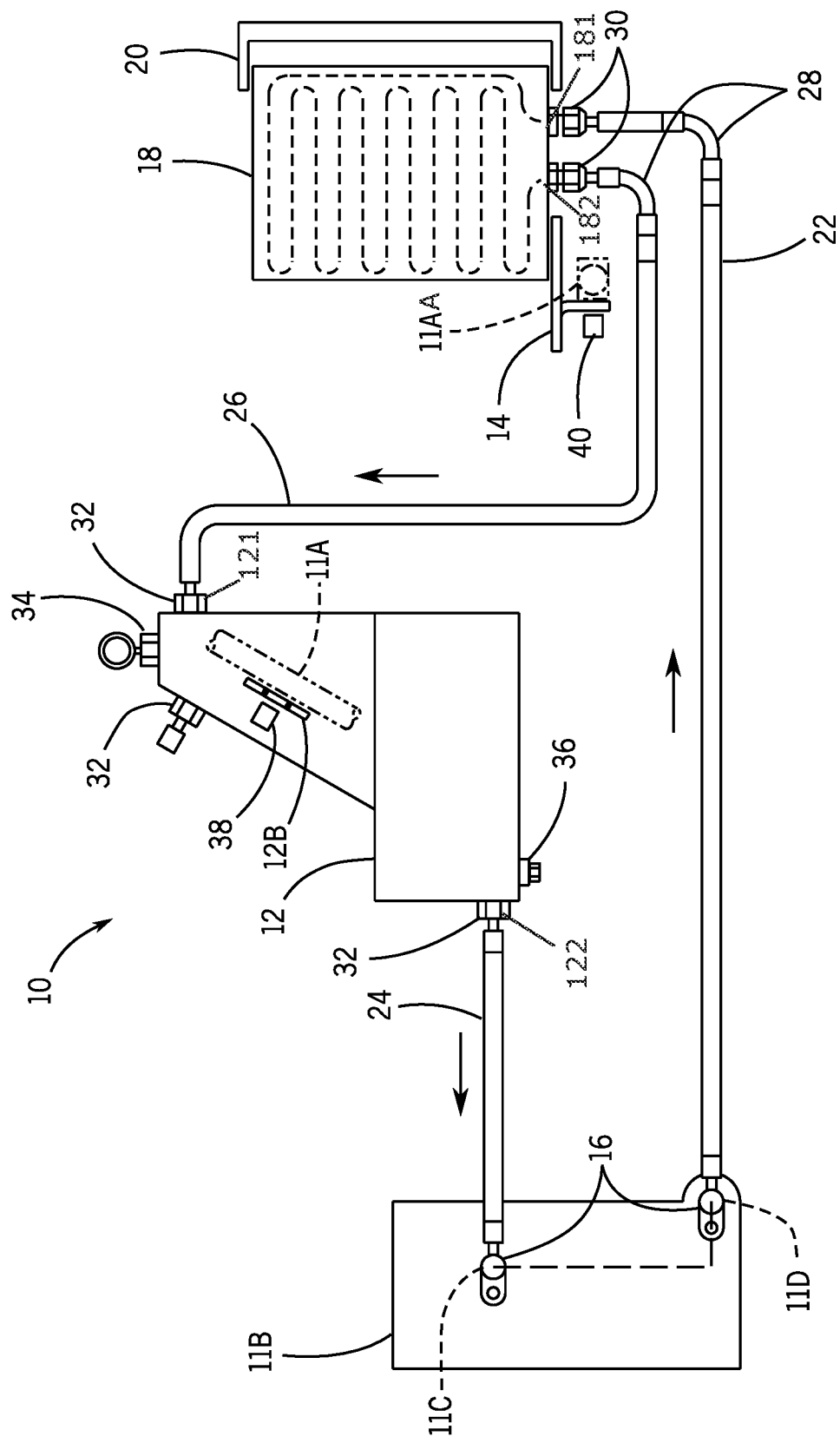
FIG. 1 is a side elevation view of an exemplary embodiment of the present invention, schematically representing the assembly. Note, that the left-side is associated with the front of the vehicle.

Referring now to FIG. 1, the present invention may include an oil cooling system 10 for an All-Terrain Vehicle (ATV), and a method of improving the oil cooling system thereof. The oil cooling system 10 and method may include a reservoir tank 12, a motor 11B, a cooler 18 that has been relocated along the front frame 11AA of the ATV by way of a relocation bracket 14, and a plurality of fluid lines fluidly coupling these systemic components, as described in more detail below.

The cooler 18 is a heat exchanger for oil cooling the combustion engine of the ATV. The cooler 18 has an input port 181 and an output port 182. The output port 182 is fluidly coupled to an input port 121 of the reservoir tank 12. The reservoir tank 12 has an output port 122 that is fluidly coupled to an oil-in port 11C of the motor 11B. The motor 11B has an oil-outport 11D that is fluidly coupled to the input port 181 of the cooler 18.

Accordingly, three fluid lines 22, 24, and 26 connect in series the motor 11B to the cooler 18 and in turn to the reservoir tank 12, respectively. The first fluid line 22, may be longer than the second fluid line 24, which in turn is longer to the third fluid line 26. The fluid lines 22, 24, and 26 may be 6 an hoses or the like. There may be hose clamps provided to facilitate the fluid connections.

Figure 5:
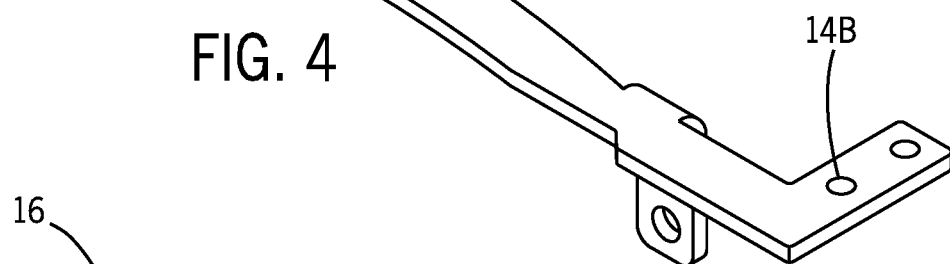
FIG. 5 is a perspective view of an exemplary embodiment of a custom-made barbed fittings 16 of the present invention.
Figure 6:
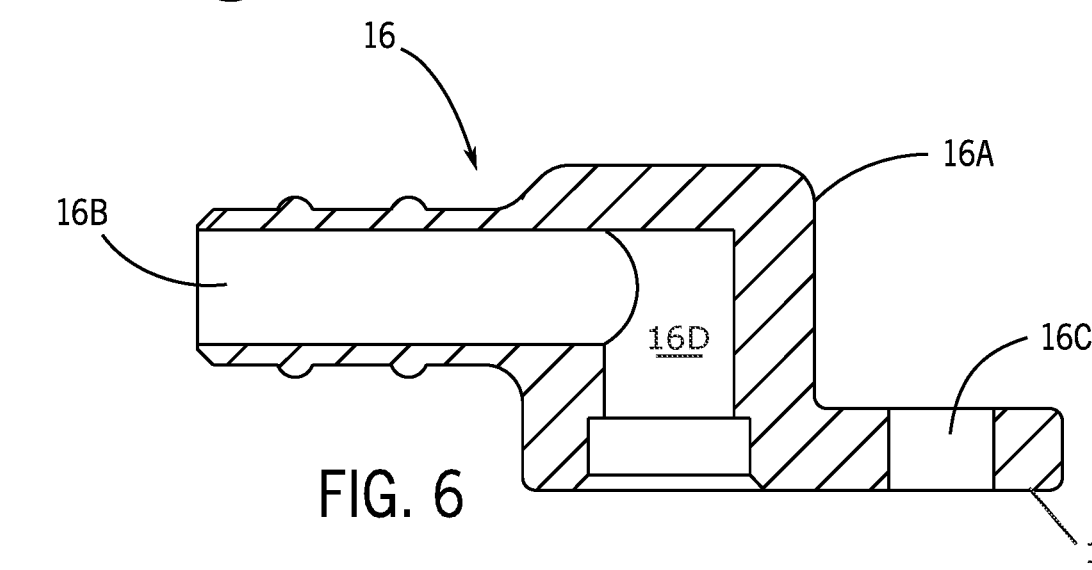
FIG. 6 is a cross-sectional view of FIG. 5 taken along line 6-6.

The fluid lines 24 and 22 inputting and outputting oil to and from the motor 11B may be physically coupled to the engine/motor 11B by way of barbed fittings 16. Likewise, the fluid line (22 and 24) connections to and from the cooler 18 and the fluid lines to (26 and 24) to and from the reservoir tank 12 may be physically linked by way of adaptors 30 and barbed tank mount fittings 32, respectively, or the like. Of course, elbows 28 or other conduit couplers may be utilized to facilitate the fluid connections between the systemic components: reservoir tank 12, motor 11B, and the cooler 18. In certain embodiments, the adaptors 30 may be 10 an-6 an adaptors and the elbow 28 may be a ⅜th 90-degrees 10 an-6 an fitting. The barbed fittings 16 may be a ⅜th 10 an-6 an fittings, though other embodiments may be used, as shown in FIGS. 5 and 6.

The reservoir tank 12 may include a tank body 12A having a dipstick tank mount 34 and a tank-mount drain plug 36. The reservoir tank 12 may be a non-OEM tank, that is part of a kit of the present invention. The kit and a method of installing the kit, and thereby improving to efficiency of the cooling system 10, includes mounting structure 12B (e.g., including but not limited to mounting ears) and mounting fasteners 38 for mounting the improved reservoir tank 12 to the frame 11A of the ATV.

The cooler 18 may be a 12-row oil cooler or other heat exchanger. The cooler 18 may be secured to the front frame 11AA of the ATV by way of mount elements 14 and fasteners 40. A cooler guard 20 may be provided to protect the cooler 18 from damage by debris that can kicked up in the direction of the cooler 18 when the ATV is driven.

The barbed fittings 16 allow oil to flow from the motor (11B) cavity through the fluid lines into the oil cooler 18 which then returns to the oil tank 12 and then flows down back in the motor through the top barbed fitting 16/oil-in port 11C. The dual barbed fittings are important because the OEM is a single hose and will not use new thread as needed on the tank. The clamps allow for a tight seal around the hoses. The oil tank 12 provides the storage of excess oil to be cooled, and the oil cooler 18 provides the oil to be cooled while flowing through the system. Cooling fans could be added but would cause extreme damage to the cooler if impacted by a rock or stick.

Figure 2:
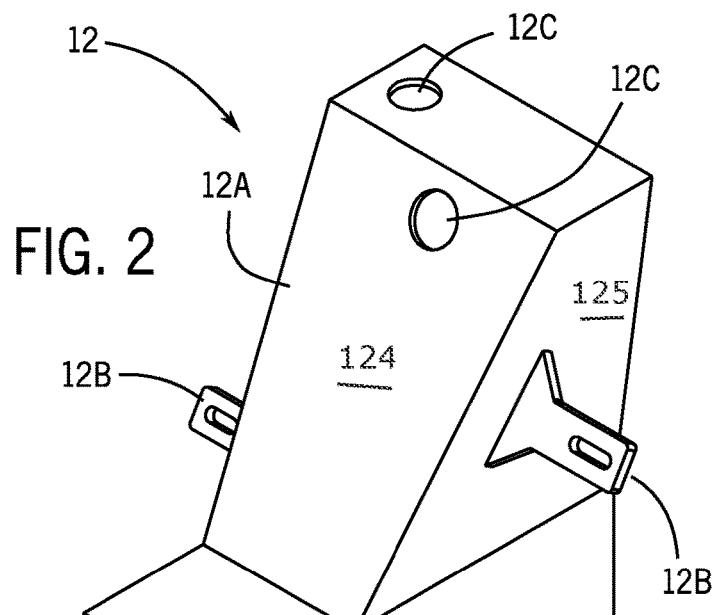
FIG. 2 is a top front perspective view of an exemplary embodiment of a reservoir tank 12 of the present invention.
Figure 3:
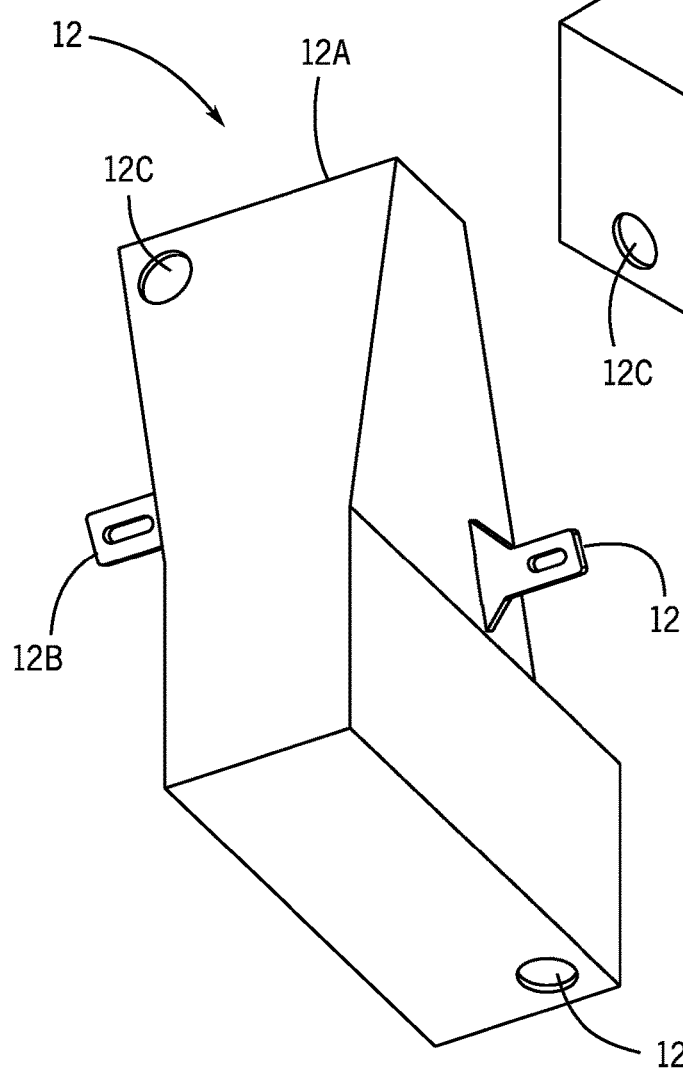
FIG. 3 is a bottom rear perspective view of an exemplary embodiment of the reservoir tank 12 of the present invention.

Referring to FIGS. 2 and 3, the pre-assembled reservoir tank 12 is illustrated showing the access holes 12C for the input port, the output port, the dipstick port, and the drainage port. The tank reservoir may include a rectangular base portion 123 and an asymmetrical hexahedron shaped upper portion 124. Along two opposing sides 125 of the upper portion 124 may provide mounting ears 12B transversely joined thereto. The mounting ears 12B may have slots 12B1 extending laterally, wherein longitudinally extends upward and downward as shown in FIG. 2.

Figure 4:
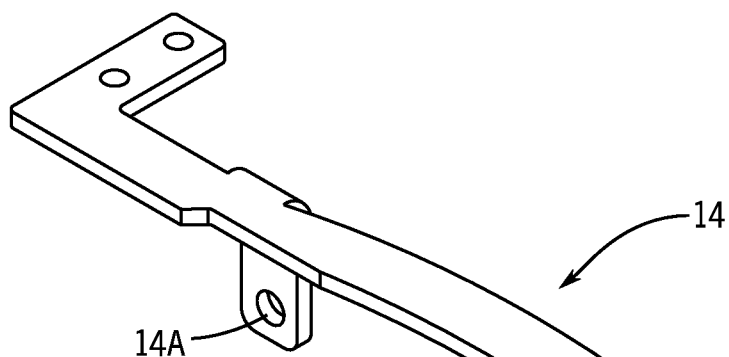
FIG. 4 is a detailed perspective view of an exemplary embodiment of an oil cooler relocating bracket 14 of the present invention.

Referring to FIG. 4, the relocating bracket 12 may have an elongated U-shape. The two leg portions of the U-shape may provide one or more mounting points 14B. Depending downward on the body portion of the U-Shape may be elements providing oil cooler mounting points 14A. From FIG. 1 it can be seen that a fastener from a rearward location connects to a front frame member 11AA so that the U-shape extends forward of the front frame member 11AA, so as to support the cooler forward of the front frame member 11AA, so as to exposed to the external environment outside and beyond the body parts/panels of the vehicle.

Referring to FIG. 5, the barbed fitting 16 may provide a threaded portion having a passage 16B fluidly connected to chamber 16D defined by the body 16A of the barbed fitting 16. Extending radially from the cylindrical body 16A may be a flange 16E having a mounting hole 16C.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees.

Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A method of improving a cooling system of an original manufacturer (OM) All-Terrain Vehicle (ATV), the method comprising:
    relocating a heat exchanger of the cooling system so that the heat exchanger is outside of a frame of the ATV and forward of body paneling of the ATV so that the relocated heat exchanger is farther away from an engine of the ATV and farther downward relative to an OM location of the heat exchanger;
    replacing an OM reservoir tank with a systemic reservoir tank that is substantially larger by volume, wherein the systemic reservoir tank has an asymmetrical hexahedron-shaped upper portion fluidly coupled to a cuboid lower portion, wherein the upper portion has a fastener ear projecting from each opposing side at dissimilar elevations relative to each other, wherein a front surface and a rear surface of the upper portion each provide an upper access hole, and wherein the lower portion provides a lower access hole along a rear surface thereof; and
    attaching the systemic reservoir tank to opposing portions of the frame by way of the fastener ears.

2. The method of claim 1, further attaching the relocated heat exchanger to the frame by way of a U-shaped bracket that exposes the relocated heat exchanger to an external environment by projecting the relocated heat exchanger beyond the frame.

3. The method of claim 1, further fluidly coupling the systemic reservoir tank and the relocated heat exchanger to the engine of the ATV as well as each other by way of fluid lines, wherein two of the fluid lines are coupled to the engine by way of threaded barbed fittings.

4. A kit for improving a cooling system of an original manufacturer (OM) All-Terrain Vehicle (ATV), the kit comprising:
    a U-shaped bracket dimensioned to connect to a front portion of a frame of the ATV so that a two legs of the U-shaped bracket extend forward of the front portion of the frame;
    a cooler guard dimensioned and shaped to shield a relocated heat exchange, supported by the U-shaped bracket, from damage by debris;
    a systemic reservoir tank, wherein the systemic reservoir tank is substantially larger by volume than an OM reservoir tank of the ATV, wherein the systemic reservoir tank has an asymmetrical hexahedron-shaped upper portion fluidly coupled to a cuboid lower portion, wherein the upper portion has a fastener ear projecting from each opposing side at dissimilar elevations relative to each other, wherein a front surface and a rear surface of the upper portion each provide an upper access hole, and wherein the lower portion provides a lower access hole along a rear surface thereof;
    plurality of fluid lines; and
    at least two threaded barbed fittings connected to two of the plurality of fluid lines to an engine of the ATV.

5. The method of claim 1, further comprising attaching a cooler guard along a front portion of the relocated heat exchanger.

6. The method of claim 1, wherein each fastener ear provides a slot for selectively locating the systemic reservoir tank within the frame.

7. The method of claim 1, wherein said upper portion of the systemic reservoir tank provides a dipstick tank mount.

8. The kit of claim 4, wherein each fastener ear provides a slot for selectively locating the systemic reservoir tank within the frame.

9. The kit of claim 4, wherein said upper portion of the systemic reservoir tank provides a dipstick tank mount.

* * * * *